(12) United States Patent
O'Brien et al.

(10) Patent No.: US 7,752,337 B1
(45) Date of Patent: Jul. 6, 2010

(54) SCALABLE COMPUTER SYSTEM

(75) Inventors: Fergus O'Brien, Melbourne (AU); Matthew Roughan, North Carlton (AU)

(73) Assignee: Jifmar Pty Ltd, New South Wales (AU)

( * ) Notice: Subject to any disclaimer, the term of this patent is extended or adjusted under 35 U.S.C. 154(b) by 853 days.

(21) Appl. No.: 10/030,342

(22) PCT Filed: Jun. 30, 2000

(86) PCT No.: PCT/AU00/00796

§ 371 (c)(1),
(2), (4) Date: Dec. 28, 2001

(87) PCT Pub. No.: WO01/02972

PCT Pub. Date: Jan. 11, 2001

(30) Foreign Application Priority Data

Jun. 30, 1999 (AU) .................................... PQ1286

(51) Int. Cl.
*G06F 15/173* (2006.01)
*G06F 15/16* (2006.01)
*G06F 15/00* (2006.01)

(52) U.S. Cl. ........................ 709/249; 709/238; 709/239; 712/10

(58) Field of Classification Search ................. 709/238, 709/239, 249; 712/10, 11, 15
See application file for complete search history.

(56) References Cited

U.S. PATENT DOCUMENTS

| 5,371,852 | A | * | 12/1994 | Attanasio et al. | ............. | 709/245 |
| 5,602,839 | A | * | 2/1997 | Annapareddy et al. | ...... | 370/405 |
| 5,859,975 | A | * | 1/1999 | Brewer et al. | ................ | 709/213 |
| 6,009,472 | A | * | 12/1999 | Boudou et al. | .............. | 709/232 |
| 6,675,170 | B1 | * | 1/2004 | Flake | .......................... | 707/101 |
| 6,915,271 | B1 | * | 7/2005 | Meyer et al. | ................... | 705/14 |
| 7,139,262 | B1 | * | 11/2006 | Elliott | .......................... | 370/351 |
| 2003/0028667 | A1 | * | 2/2003 | Taylor et al. | ................. | 709/238 |
| 2004/0246911 | A1 | * | 12/2004 | Bonsma et al. | .............. | 370/254 |

FOREIGN PATENT DOCUMENTS

| EP | 0 404 339 A2 | 12/1990 |
| EP | 0 637 152 A1 | 2/1995 |

OTHER PUBLICATIONS

Duncan Watts and Steven Strogatz, 'Collective dynamics of 'small-world' networks, 1998, Nature. Jun. 4, 1998;393(6684):440-2.*

(Continued)

*Primary Examiner*—Aaron Strange
(74) *Attorney, Agent, or Firm*—Winstead PC (57) ABSTRACT

The present invention utilizes a "small-world" network architecture, in which a relatively small number of random cross-links of nodes or vertices in a network can result in small characteristic path lengths, for the transfer of messages between modes or vertices in a telecommunications/computer network regardless of their location. The "small world" principle is usually considered to apply to many biological and social networks, as these systems generally exhibit properties that are not completely regular or completely random but somewhere in between. The present invention applies this small world principle to telecommunications/computer networks.

12 Claims, 5 Drawing Sheets

OTHER PUBLICATIONS

Lada A. Adamic, 'The Small World Web, 1999, Proc. 3rd European Conf. Research and Advanced Technology for Digital Libraries, pp. 443-452.*

M. Faloutsos, P. Faloutsos, and C. Faloutsos, "On Power-Law Relationships of the Internet Topology", 1999, SIGCOMM 99, pp. 251-262.*

Valdis Krebs, "The Social Life of Routers", Dec. 2000, The Internet Protocol Journal, vol. 3, No. 4.*

Mark Buchanan, "Small World Networks", 2003, Available at: http://www.complexityscience.org/NoE/smallworldsfocus.pdf.*

James J. Collins and Carson C. Chow, "Its a small world", Jun. 1998, Nature, vol. 393, pp. 409-410.*

Marc Barthelemy and Luis Amaral, "Small World Networks: Evidence for a Crossover Picture", Apr. 12, 1999, Physical Review Letters, vol. 82, No. 15, pp. 3180-3183.*

M. E. J. Newman and D. J. Watts, "Renormalization group analysis of the small-world network model", 1999, Phys. Lett A 263.*

Albert-Laszlo barabisi and Reka Albert, "Emergence of Scaling in Random Networks", 1999, Science, vol. 286, No. 5439, pp. 509-512.*

Ken Y.K. Hui, John C.S. Lui, David K.Y. Yau, "Small-World Overlay P2P Networks: Construction and Handling Dynamic Flash Crowd", 2006, The Computer Networks Journal, 50(130, pp. 2255-2270.*

Marc Barthelemy and Luis Amaral, "Small World Networks: Evidence for a Crossover Picture", Jun. 21, 1999, Physical Review Letters, vol. 82, No. 25, pp. 5180.*

Milan Kovacevic, "On Torus Topologies with Random Extra Links", 1996, In Proc. of INFOCOM '96, pp. 410-418.*

* cited by examiner

SCALABLE COMPUTER SYSTEM

FIELD OF THE INVENTION

This invention relates to computer systems and more particularly, but not exclusively, to a computer system which is required to have a large number of computer processors for use in large scale system applications. The present invention has application to scalable telecommunications and intelligent networks.

BACKGROUND ART

Recent developments in telecommunications and intelligent networks, primarily involving the field of photonics, are resulting in a rapid expansion of bandwidths available for communication. The available bandwidth is currently growing at a rate involving, roughly, a factor of two every two years, and it is anticipated that communication bandwidths may increase by at least three orders of magnitude over the next ten years.

In order to match this rapid bandwidth growth in the level of telecommunications, equivalent computing power is required. It is therefore desirable to design a computer based system architecture that is massively scalable. The scalability is essentially driven by the number of independent users, as in mobile phone devices, rather than the complexity or size of an individual application.

Hitherto, there has been no known solution to the problem of designing a massively scalable architecture for the intelligent network (IN) domain.

The Internet is a large computer system, but it is a hierarchical system and hence does not address the issue of massive scalability.

Other computer system architectures that are known are only scalable in many orders of magnitude less than what will be required in the near future in telecommunications and intelligent networks.

Figure 1:
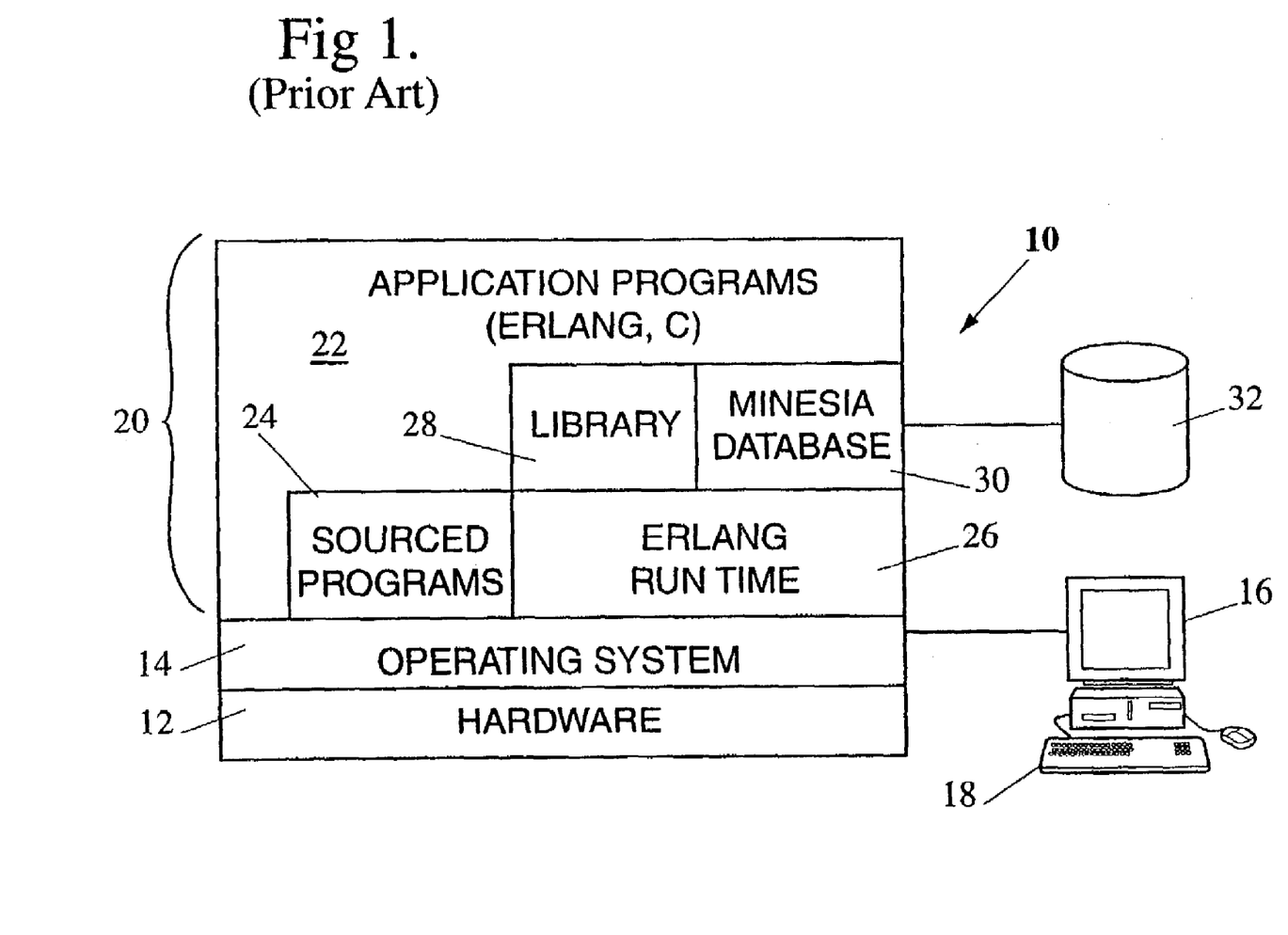
FIG. 1 is a diagram of a prior art single node computer system, which has limited scalability.

For example, the computer system of FIG. 1 is based on an Erlang/Open Telecom Platform (OTP) running on a single node. The computer system 10 includes hardware 12, an operating system 14, a display 16 and a keyboard 18 and a suite of programs 20 which include application programs 22 (eg. in programming languages, Erlang and C), sourced programs 24, run-time programs 26, a library 28, and a database 30. The system may be linked to an external database 32 if required.

The single node provides reasonable system development facilities, including an Erlang real time environment, or interpretive environment. However, this is achieved at the expense of potential performance owing to the interpreter/operating system layers.

The single node computer system of FIG. 1 may be linked to other similar nodes by an asynchronous transfer node (ATM) switch, such as the AXD-301 switch with satisfactory performance. However, this switch has a scalability of 1:30, which is orders of magnitude less than that which is required for ultra high communication bandwidths.

Figure 2:
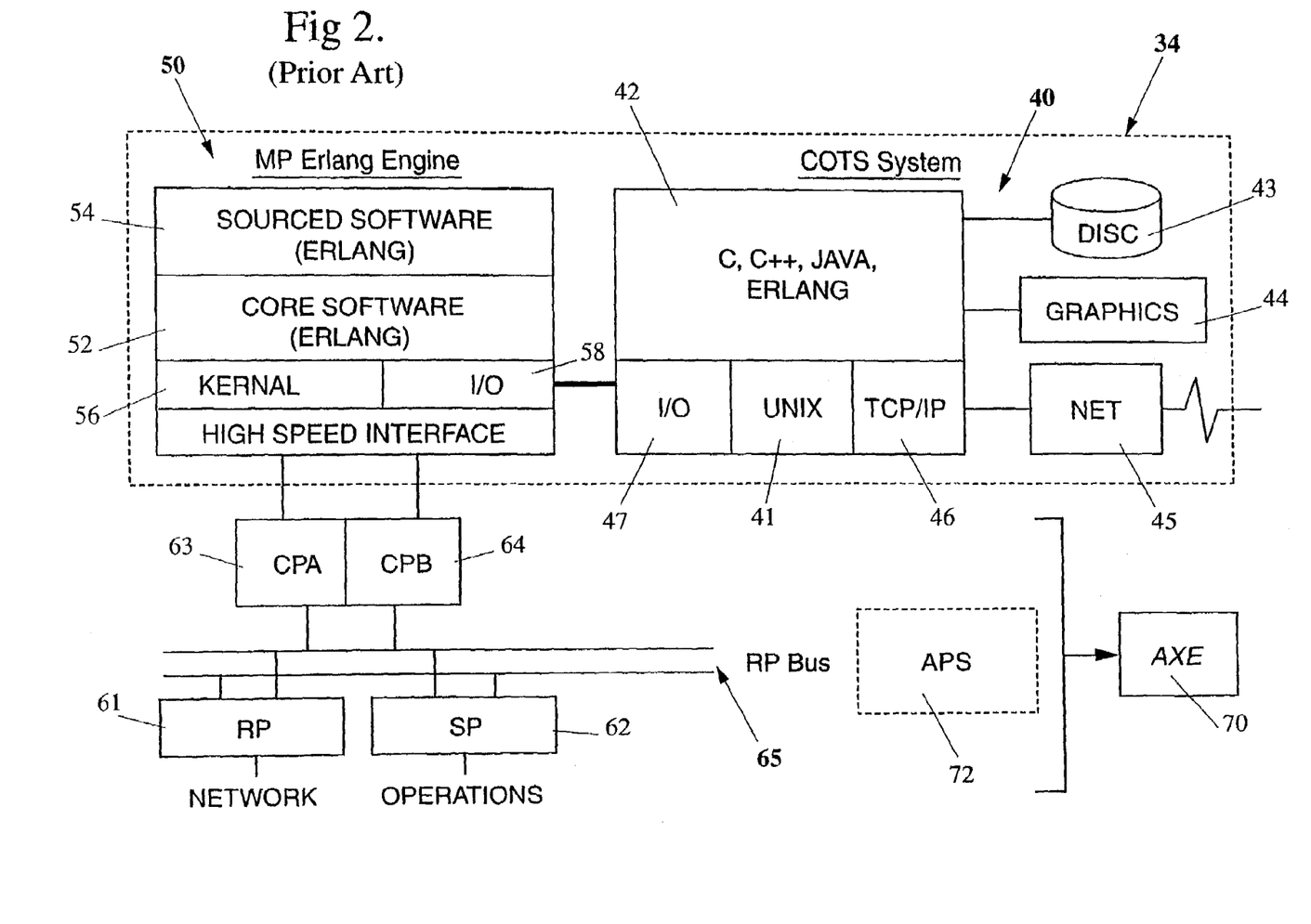
FIG. 2 is a diagram of a prior art split node computer system.

Referring to FIG. 2, there is shown a split node computer system in which an OTP node 34 is split into two closely couple nodes: a COTS (commodity of the shelf) system 40 and a multi-processor (MP) Erlang Engine 50. The COTS system is essentially the base system and may comprise of a UNIX operating platform 41, application programs (eg. in C, C++, Java and Erlang) 42, a disc drive 43, graphics 44, an Internet modem 45, an Internet interface (TCP/IP) 46 and an input/output interface (I/O) 47 for communicating with the Erlang Engine 50.

The Erlang Engine 50 is a shared memory MP system running software 52 and 54 in Erlang on top of an optimized message passing kernel (56) such as QNX. The Erlang Engine 50 also has an I/O interface 58 for communicating with the COTS system 40. One processor of the MP set can be devoted to monitoring software, the remainder to functional processing.

The split node OTP system 34 of FIG. 2 may form part of a network that includes a plurality of regional processors (RP) 61 and support processors (SP) 62 for operators. The regional and support processors 61, 62 are connected to central processors CP A 63 and CP B 64 and to each other by a high speed RP bus 65. The MP Erlang Engine 50 includes a high speed interface 59 for communicating with the central processors CP A 63 and CP B 64.

The split node OTP system 34 can be linked to other computer systems by a switch 70 such as an AXE-10. For this purpose an AXE programming system (APS) 72 may be provided. In a telecommunications application, the interface shown to the AXE-10 may be implemented as a high speed Ethernet, primarily due to the availability of the Ethernet PLEX (Programming Language for Exchanges) blocks existing on AXE-10. The Erlang to PLEX interface has been demonstrated in two modes, firstly with the AXE-10 controlling the links, as in a call forwarding application. The second mode is with OTP in control, with an application such as remote changes to AXE-10 tariff tables.

The scalability limit of the Erlang Engine is a maximum of eight processors, given that it is a shared memory environment. The eight processors, together with a demonstrated 5× speed up from the move to compiled code, plus 2× moving from Unix to QNX gives a scale-up of 80 from the base system.

Therefore it is apparent that both of these known systems have limitations in terms of their scalability and could not be considered massively scalable.

It is therefore desirable to provide a massively scalable computer system including a large number of processors in which each processor can communicate effectively with other processors without regard to their locations.

SUMMARY OF THE INVENTION

According to one aspect the present invention provides a telecommunications system having a plurality of nodes, such that the plurality of nodes are clustered in a plurality of interconnected neighborhoods, the system characterised in that a relatively small number of cross-links are provided between nodes of different neighborhoods.

According to another aspect, the present invention provides a large scale computer system including a multiplicity of nodes, each node having a plurality of interconnected processors, said nodes being arranged in a network with neighbouring sets of nodes of the network forming neighbourhoods of fully interconnected nodes, wherein random links are provided between nodes of different neighbourhoods in the network whereby each processor of the system can communicate effectively with other processors regardless of their location in the network without full connectivity in the network.

In essence, the present invention has come about through the realisation that problems associated with telecommunication and intelligent network scalability and/or computer architecture design, can be addressed by applying the "small world" principle.

The "small world" concept was derived from the "six degrees of separation" principle. Six degrees of separation is a theory that a person may reach anyone in the world through at the most six personal contacts. This theory was explored through an Internet site based upon the actor Kevin Bacon. This site was created out of curiosity, but was a very useful sociological experiment for illustrating the six degrees of separation principle. The site however, gave no hint as to any underlying structure of the people involved in the interconnections. The key to the underlying structure may be derived from studies into epidemics. For example diseases, such as the Black Death spread with great rapidity from one part of the world to another: from the Middle East to Europe. In that situation, the epidemic mechanism was that of an area that already had the disease within a defined group, and a single vector, such as ship-borne rats travelling to another defined group.

By understanding the relationship between epidemics and the six degrees of separation principle, it is apparent that the underlying structure of the six degrees of separation principle was a set of richly connected groups with a small number of inter-group links. It is this combination of richly connected neighborhoods, with a small number of links between them that is termed a "small world" network.

In other words, the present invention utilizes a "small-world" network architecture, in which a relatively small number of random cross-links of nodes or vertices in a network can result in small characteristic path lengths, for the transfer of messages between nodes or vertices in a telecommunications/computer network regardless of their location.

BRIEF DESCRIPTION OF THE DRAWINGS

A preferred embodiment of the present invention will now be described, by way of example only, with reference to the accompanying drawings in which:—

DETAILED DESCRIPTION

The "small world" principle is usually considered to apply to many biological and social networks, as these systems generally exhibit properties that are not completely regular or completely random but somewhere in between. For example, infectious diseases exhibit "small world" properties. In this regard, it has been shown that infectious diseases spread more easily in small world networks than regular lattices.

Figure 3:
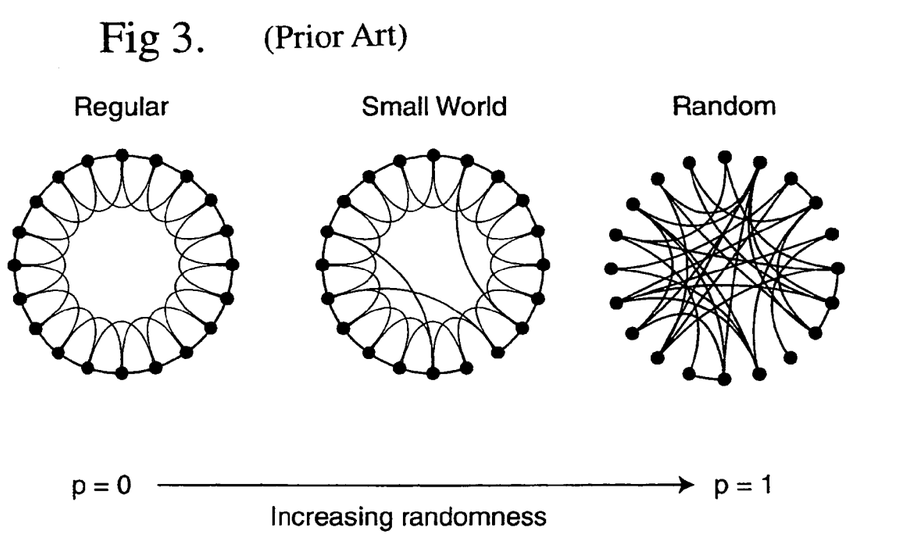
FIG. 3 is a diagram showing the difference between a "small world" network and regular ring and random networks.

The present invention applies this small world principle to telecommunications/computer networks. A comparison of the performance of a small world telecommunications network, to that of regular and random telecommunications networks will now be provided. Examples of regular, small-world and random networks are shown in FIG. 3.

In very large telecommunications networks with only local connections most vertices or nodes in the network are separated by many links. In regular lattice or ring structures with local connections between vertices or nodes, the characteristic or mean distance of the path length (L) between two vertices or nodes grows approximately linearly with the size of the network. On the other hand, in a network with only random connections between vertices or nodes, the characteristic path length (L) grows logarithmically with the number of vertices or nodes. A network with only random connections, however, is a poorly clustered environment, as a sparse number of random connections can result in some vertices or nodes not being inter-connected to other nodes at all.

A small world telecommunications network in accordance with the present invention is one in which vertices or nodes in local "neighborhoods" or "clusters" are interconnected to each other, and a relatively small number of random links or connections are provided between nodes of different neighborhoods of the network.

In "Collective dynamics of "small-world networks" by Duncan J. Watts & Steven H. Strogatz, Nature, Vol. 393, pp. 440-442, a mathematical approach to defining structural properties of small-world networks was provided in terms of characteristic path length L(p) and clustering coefficient C(p). L(p) measures the typical separation between two vertices in a network (a global property) and C(p) measures the clustering or connections in a typical neighborhood (a local property), where p is a probability factor.

In a regular network having n nodes and k edges or links per nodes, p=0, L(0) grows linearly with n, the number of nodes in the network, and C(0) depends on the specific geometry or 'wiring' of the network.

In a completely random network with only random connections, p=1 and L-random grows logarithmically with n, whereas C-random≈k/n<<1.

Figure 4:
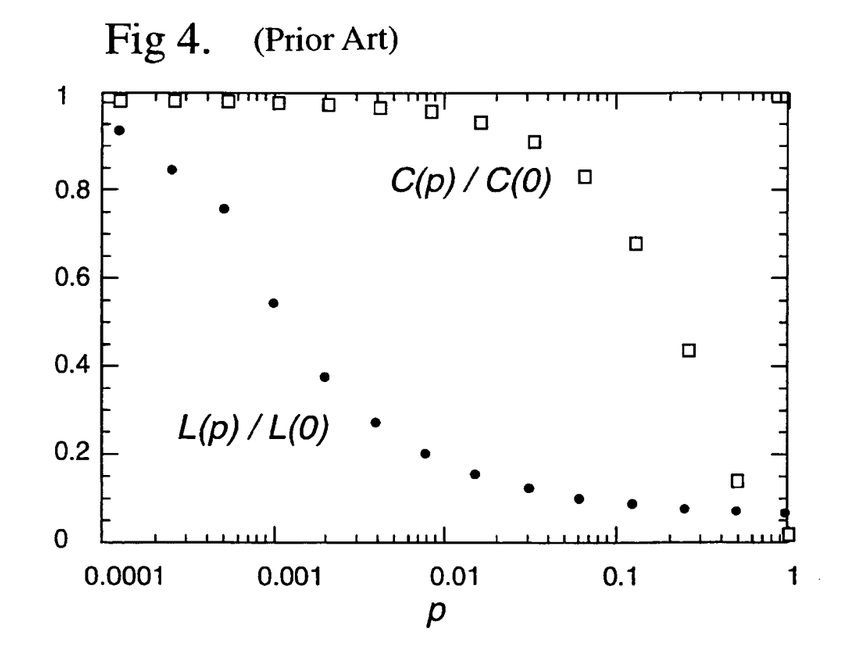
FIG. 4 is a graph showing variations in clustering and average path length with increasing randomness in a ring network.

"Small-world" networks, on the other hand, have a broad interval of p over which L(p) is almost small as L random, yet C(p) is much greater than C-random. This is shown in the graph of FIG. 4.

Watts and Strogatz thus demonstrated numerically that a few random global connections are sufficient to turn a regular network into a small-world network to reduce the path length of the number of links for effective communication between nodes or vertices drastically.

Hanspeter Herzel in his article entitled "How to Quantify Small-World Networks" (Fractals, Vol. 6, No. 4 (1998) 301-303) derived a formula for the mean connectivity $k^{\mathit{eff}}$ of nodes in a small-world ring network. For a ring network with k edges of links per node, in which a fraction of p connections are re-wired randomly the formula was:

$$k^{\mathit{eff}} = k \cdot p$$

When $k^{\mathit{eff}} > 1$, the characteristic path length L(p) may be expressed as follows:

$$L(p) = \frac{\ln(n)}{\ln(k^{\mathit{eff}})} = \frac{\ln(n)}{\ln(k) + \ln(p)}$$

Such a logarithmic curve approximates the curve L(p)/L(0) in FIG. 4.

In the present invention, the number of nodes in the network, the number of nodes in the neighborhood, the number of nodes per neighborhood and the number of cross-links in the network may each be varied for different applications, provided that the network functions as a small-world network with large clustering C(p) and small average path lengths L(p).

The cross-links in the small-world network of the present invention may be chosen completely at random. Alternatively, a pseudo-random selection process may be used to select the cross-links between neighborhoods to convert a regular network into a highly clustered small-world network with a relatively small average path length. In this regard, an acceptable result in terms of the number of hops per inter-process message, from a system process point-of-view, is under two.

In one preferred embodiment of the invention a mean connectivity falling substantially in the range from about 1.5 to about 2.0, and preferably about 1.6, may be achieved by appropriate choice of the number of nodes per neighborhood, the connectivity of each neighborhood and/or the number of cross-links relative to the total number of nodes in the network. By way of example, in a computer system having 50 neighborhoods of 10 nodes arranged in a ring network with about 50 cross-links between neighborhoods, each node is connected to 9 other nodes in its neighborhood (k=9) and the probability factor p=50×2/500. Thus $$k^{eff} = 9 \times \frac{100}{500} = 1.8$$

The number of interconnected processors in each node of the computer system may also vary for different applications. With the development of photonics, it is envisaged that up to about 256 nodes, each containing up to eight processors per node may be fully connected together by optical fibres and a high speed switch to form a single neighborhood in a small-world network. With a large number of such neighborhoods in the small-world network connected by a relatively small number of cross-links, it is possible to achieve a massively scalable computer system with a very large number of total processors in the system which are able to communicate with each other in an effective manner.

There will now be explained with reference to FIG. 6, an example of how a "small-world" network architecture can be used to achieve a large scale computer system of about one million processors in which each processor of the system is able to communicate effectively with other processors in the system without requiring full connectivity.

Figure 6:
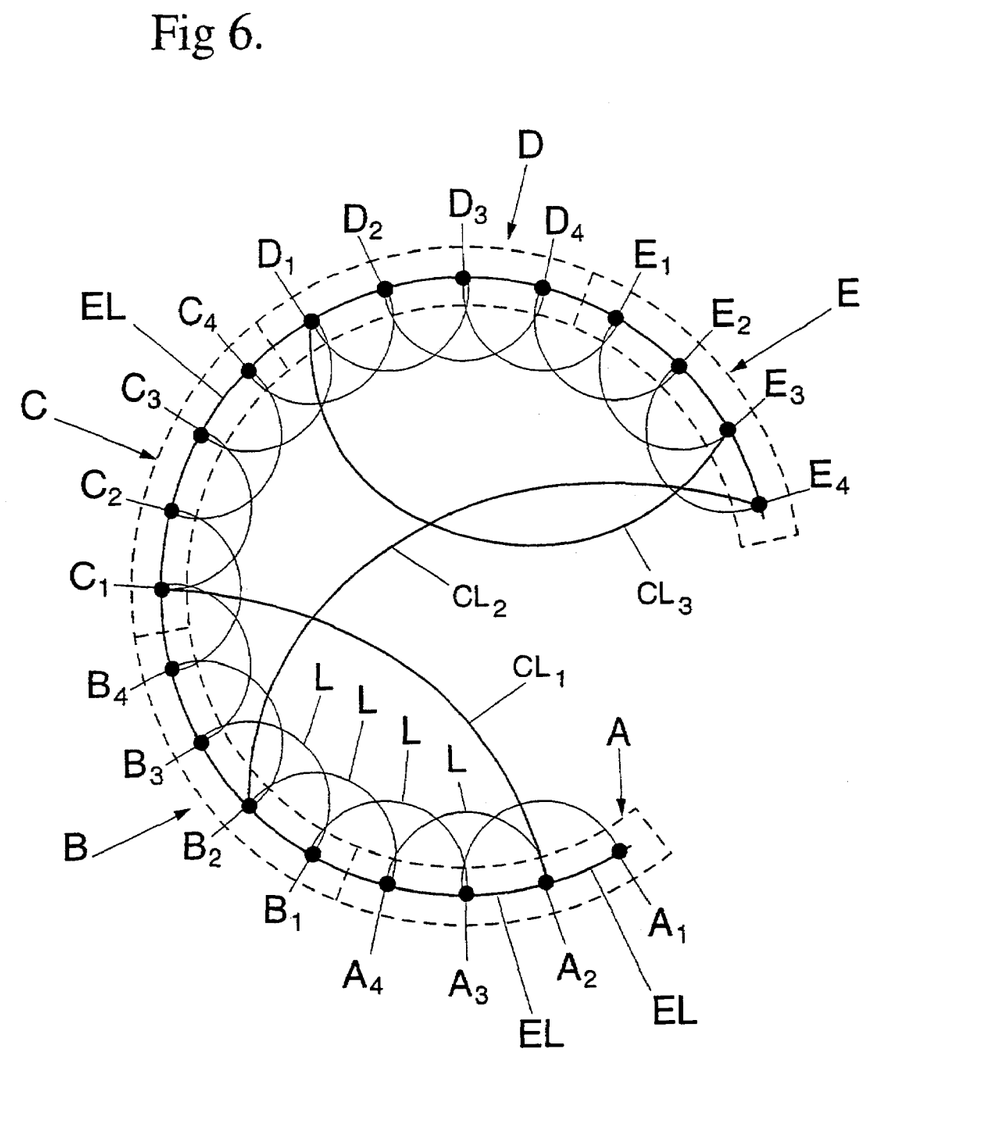
FIG. 6 is a diagram of a small-world architecture for a computer system in accordance with the invention.

FIG. 6 shows a small-world telecommunications network in which there are 20 nodes arranged in a ring layout. The 20 nodes of the ring network can be considered to form five neighborhoods of nodes A, B, C, D and E in which there are four nodes ($A_1$ to $A_4$; $B_1$ to $B_4$; $C_1$ to $C_4$; $D_1$ to $D_4$; and $E_1$ to $E_4$) per neighborhood.

Each node eg $A_2$ is connected to adjacent nodes $A_1$, $A_3$ by an edge link EL and alternate nodes eg $A_1$, $A_3$; $A_2$, $A_4$; $A_3$, $B_1$ are connected to each other by a small loop link LL.

A network connected only in this manner would normally be termed a regular network in which messages from one node, eg $A_1$, must pass through a relatively large number of links to reach a node at the opposite side of the network, eg $C_4$.

A small-world network such as shown in FIG. 6, differs from a regular network in that a relatively small number of random cross-links are provided between neighborhoods of nodes. In the example of FIG. 6, there are three cross-links $CL_1$, $CL_2$ and $CL_3$. Cross-link $CL_1$ directly connects nodes $A_2$ and $C_1$ with each other; cross-link $CL_2$ directly connects nodes $B_2$ and $E_3$ with each other and cross-link $CL_3$ directly connects nodes $D_1$ and $E_4$ with each other. It will be apparent from FIG. 6 that there is a marked increase in connectivity with only a relatively small number of cross-links between neighborhoods of nodes. For instance, a message to be sent from node $A_1$ to $C_2$ can pass along an edge link EL to node $A_2$, along cross-link $CL_1$ to C, and then along an edge link to $C_2$. This is a clear improvement over a regularly connected network, where the message would pass along four loop links to C, and an edge link EL to $C_2$. Also, a message from $B_4$ to $E_2$ can pass along a loop link to $B_2$, along cross-link $CL_2$ to $E_4$ and then along another loop link LL to $E_2$, rather than along five loop links.

It will be seen from FIG. 6 that a small-world network is an architecture that can be used to link together a relatively large number of computer processors while retaining effective connectivity between the processors.

Figure 5:
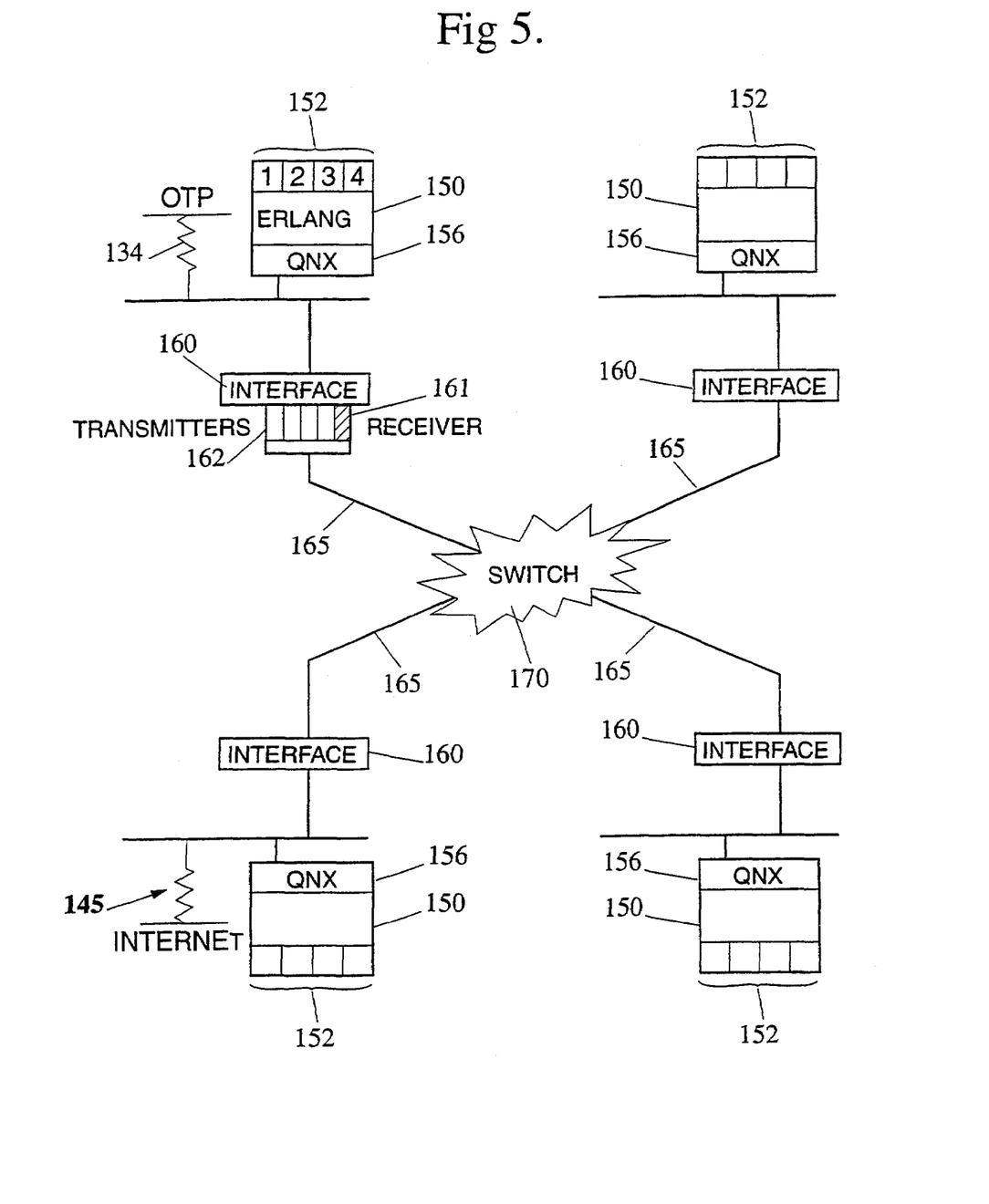
FIG. 5 is a diagram of a four-node computer system having four processors per node.

In a preferred embodiment of the invention, each neighborhood of FIG. 6 corresponds to the four-node/four-process per node computer system shown in FIG. 5. Referring to FIG. 5, there is shown a system that demonstrates it is possible to link up several MP Erlang Engines of the type shown in FIG. 2 through a high-speed blocking switch. Each node of the computer system of FIG. 5 is an Erlang Engine 150 with four processors 152 running on a QNX kernel 156. Each Erlang Engine 150 may include a link to an OTP system 134 in similar manner to split node system of FIG. 2 and may also have a local Internet connection 145.

The Erlang Engines 150 are connected to each other by optical interfaces 160, optical fibres 165 and a common high speed non-blocking optical switch 170. Each optical interface 160 may include at least one optical receiver 161 and one or more optical transmitters 162.

Currently available interface blocks 160 can handle 32 separate wavelengths: this is predicted to rise to 256 with further developments in photonics. This will permit up to 256 nodes (Erlang Engines) in a computer system such as that of FIG. 5, as each node can be essentially addressed by an individual wavelength.

A key attribute of the system of FIG. 5 is that the interface blocks can transmit one or more wavelengths, up to 256, with the same data simultaneously as a multicast facility. However, each node only receives on one wavelength: its address.

Since the system gives almost linear scaling on separable problems, 256 nodes can give a speed-up of 20,000 over the basic system.

It will be noted that the computer system of FIG. 5 is a fully connected system in the sense that each Erlang Engine 150 has its own dedicated optical fibre link 165 to the central switch 170.

Applying the system of FIG. 5 to the small world network of FIG. 6, it is apparent that even where each neighborhood is a four node/four processors per node system, a total of eighty processors can be effectively linked together by the node network of FIG. 6 with only 3 cross-links.

It is however, to be appreciated that the small-world network of FIG. 6 is, however, only a relatively small-scale example of such a network. Within the scope of the present invention it is contemplated that at least 500 neighborhoods of nodes each having up to 256 fully connected Erlang Engines per node with 8 processors per Erlang Engine could be linked together in a small-world network to achieve a total system of over one million processors, with the small-world network architecture providing effective connectivity between the nodes with only a relatively small number of cross-links, say 50, between the neighborhoods. For example, the total number of individual Erlang processors running on such a system will be of the order of 256,000,000 assuming 2000 active processors per Erlang Engine node. This gives around 25.6 million lines of code, which is of the order of magnitude already envisaged for large software systems project.

It is envisaged that a massively scalable computer system in accordance with the invention has widespread applications. In the telecommunications field, the scalability could cover applications such as mobile telephone services for stockbroking, betting and other services. The invention may also be applied to Internet proxy servers in order to accommodate an escalating number of users.

More particularly in relation to the mobile telecommunications field, the present invention may be used as a "personal information manager in the sky" whereby it coordinates communications with handheld communications devices, such as Personal Digital Assistants (PDAs).

A further application is microbank applications, whereby the present invention may be used by financial institutions in order to allow them to economically handle extremely large numbers of transactions, particularly relating to very small amounts.

It will be appreciated that various modifications and alterations may be made to the present invention as described above without departing from the scope and spirit of the present invention. For instance, as mentioned above, the size of the network, the neighborhoods in the network, the number of nodes per neighborhood, the number of cross-links between neighborhoods and the number of processors per node may be varied for different applications.

The invention claimed is:

1. A method for constructing a scalable computer system, the method comprising:
   providing a first plurality of computing nodes, and a second plurality of switching nodes, said first plurality being more numerous than said second plurality;
   forming a plurality of node clusters, each node cluster comprising one of said switching nodes interconnecting a corresponding group of said computing nodes;
   providing a plurality of cross-links between the node clusters;
   directly connecting, using the plurality of cross-links, a corresponding plurality of pairs of node clusters selected from the plurality of node clusters in accordance with a selection process resulting in a formation of a network of said plurality of computing nodes having a higher clustering coefficient of nodes in comparison with a corresponding randomly-connected network in combination with a lower characteristic path length between the nodes in comparison with a corresponding regularly-connected network; and
   wherein the steps of providing the plurality of cross-links and directly connecting the plurality of pairs of node clusters in accordance with said selection process are repeated until the resulting network comprises a small-world network having an average path length between the plurality of nodes falling within a predetermined desired range, independently of a number of said plurality of computing nodes.

2. The method of claim 1, wherein said selection process is a random or pseudo-random process.

3. The method of claim 1, wherein said predetermined range of the average path length between the plurality of nodes is less than 2.0.

4. The method of claim 3, wherein said predetermined range of the average path length between the plurality of nodes is between 1.5 and 1.7.

5. A scalable computer system constructed in accordance with the method of claim 1.

6. A scalable computer system comprising:
   a plurality of node clusters, each said node cluster comprising a plurality of computing nodes which are interconnected via a common switch; and
   a plurality of cross-links directly connecting a corresponding plurality of pairs of node clusters selected from the plurality of node clusters,
   wherein the cross-links are disposed such that the pairs of node clusters form a network of said plurality of computing nodes which has a higher clustering coefficient of nodes in comparison with a corresponding randomly-connected network, in combination with a lower characteristic path length between the nodes in comparison with a corresponding regularly connected network, and
   wherein said network comprises a small-world network having an average path length between the nodes falling within a predetermined desired range, independently of a number of said plurality of computing nodes.

7. The system of claim 6 wherein each said switching node comprises a non-blocking switch.

8. The system of claim 7 wherein each said non-blocking switch comprises a multi-wavelength optical switch.

9. The system of claim 6 wherein the pairs of node clusters are randomly, or pseudo-randomly selected.

10. The system of claim 6 wherein said predetermined range of the average path length between the plurality of nodes is less than 2.0.

11. The system of claim 6 wherein said predetermined range of the average path length between the plurality of nodes is between 1.5 and 1.7.

12. The system of claim 6 wherein each computing node of said plurality of computing nodes comprises a plurality of interconnected processors.

* * * * *